US008341748B2

(12) United States Patent
Traenkenschuh et al.

(10) Patent No.: US 8,341,748 B2
(45) Date of Patent: Dec. 25, 2012

(54) METHOD AND SYSTEM TO DETECT BREAKS IN A BORDER OF A COMPUTER NETWORK

(75) Inventors: John L. Traenkenschuh, Mackinaw, IL (US); Terry E. Jones, Metamora, IL (US); Richard V. Rosetto, Chillcothe, IL (US)

(73) Assignee: Caterpillar Inc., Peoria, IL (US)

( * ) Notice: Subject to any disclaimer, the term of this patent is extended or adjusted under 35 U.S.C. 154(b) by 1041 days.

(21) Appl. No.: 12/314,879

(22) Filed: Dec. 18, 2008

(65) Prior Publication Data
US 2010/0162384 A1   Jun. 24, 2010

(51) Int. Cl.
G06F 11/00 (2006.01)
G06F 12/14 (2006.01)
G08B 23/00 (2006.01)

(52) U.S. Cl. .......................................... 726/25; 726/14
(58) Field of Classification Search ........................ None
See application file for complete search history.

(56) References Cited

U.S. PATENT DOCUMENTS

| | | | |
|---|---|---|---|
| 5,961,644 A | 10/1999 | Kurtzberg et al. | |
| 7,152,105 B2 | 12/2006 | McClure et al. | |
| 7,257,630 B2 | 8/2007 | Cole et al. | |
| 7,325,252 B2 * | 1/2008 | Bunker et al. | 726/25 |
| 7,340,771 B2 | 3/2008 | Chan et al. | |
| 7,346,922 B2 | 3/2008 | Miliefsky | |
| 7,370,362 B2 | 5/2008 | Olson et al. | |
| 7,424,743 B2 | 9/2008 | Hrabik et al. | |
| 7,933,213 B1 * | 4/2011 | Croak et al. | 370/248 |
| 2003/0014669 A1 | 1/2003 | Caceres | |
| 2004/0117624 A1 | 6/2004 | Brandt et al. | |
| 2005/0005129 A1 * | 1/2005 | Oliphant | 713/182 |
| 2005/0265351 A1 * | 12/2005 | Smith et al. | 370/395.2 |
| 2006/0021049 A1 | 1/2006 | Cook | |
| 2007/0271614 A1 | 11/2007 | Capalik | |
| 2008/0005555 A1 | 1/2008 | Lotem et al. | |
| 2008/0098479 A1 | 4/2008 | O'Rourke et al. | |
| 2008/0209566 A1 | 8/2008 | Ziv | |
| 2008/0235801 A1 | 9/2008 | Soderberg et al. | |
| 2009/0080337 A1 * | 3/2009 | Burns et al. | 370/248 |

* cited by examiner

*Primary Examiner* — Kaveh Abrishamkar
(74) *Attorney, Agent, or Firm* — Finnegan, Henderson, Farabow, Garrett & Dunner LLP

(57) ABSTRACT

A method for detecting breaks in a border of a network is disclosed. The method may include monitoring network regulation and shaping traffic passing through the border. The method may also include providing, by a first confederate server on a first side of the border, a first connection request to a second confederate server on a second side of the border. Further, the method may include providing, by the second confederate server on the second side of the border, a second connection request to the first confederate server on the first side of the border. The method may also include executing a network diagnostic command if one or more of the first or second connection request is granted. Further, the method may also include copying any outputs of the network diagnostic command to a file.

20 Claims, 4 Drawing Sheets

METHOD AND SYSTEM TO DETECT BREAKS IN A BORDER OF A COMPUTER NETWORK

TECHNICAL FIELD

The present disclosure relates generally to systems and methods to protect an internal network, and more particularly, to a system and method to detect breaks in the border of a computer network.

BACKGROUND

Computer networks are a key element in most modern communication systems. To protect the security and integrity of computer networks, various tools have been used by network administrators, government, and security consultants to test the vulnerabilities of computer networks. These tools may detect unauthorized access to the computer network, unauthorized attempts to access the computer network, or look for known vulnerabilities of the computer network. These tools are concentrated on the interface between the computer network and external networks, such as the Internet. The interface defines a change in the level of trust between two networks and/or computers. The interface can be characterized as a network border, and typically comprises hardware (e.g., servers) and software (e.g., firewalls).

To maintain the security and integrity of a computer network, all traffic should pass through network borders. Traditionally, network borders embodied dedicated security gateways, that provided a single point of entry/exit for data to travel to/from a private network. These security gateways were often separate from the networking hardware, and were highly customized to be compatible with the specific specification of the network. Recently, however, many hardware components, such as routers and switches, began incorporating security functions that are customized to particular vulnerabilities of the hardware component. As a result, the traditional model of a centralized security gateway for an entire network gave way to decentralized security features at the network hardware level, thereby creating a plurality of potential security vulnerability points or "breaks" in the network.

Such vulnerabilities in a network border are difficult to detect, yet easily created by accident or on purpose. Those breaks that involve a device participating in routing announcements are relatively easy to find; they will shape traffic to flow through them. Devices that simply forward traffic across their active network interfaces are difficult to detect. To detect them, the traffic flow must be detected or it must be known that they exist and potentially can pass traffic from an external network to an internal network. Additionally, when the internal network includes wireless technologies, another point of vulnerability is added. A wireless access point (WAP) may not contain the same security features as the rest of the border of the internal network. The WAP may become a point of failure allowing access to the internal network.

Further, the growth of proxy servers and peer devices has increased the vulnerability of internal networks. A peer device features the same network connections as a firewall and can provide the same path but without comparable security. Some routers that operate as a peer device to the firewall have a hidden forwarding ability that will pass traffic in unpredictable ways while altering the data packets to give the appearance that the traffic originates from the router itself. Also, proxy servers may be misconfigured, turning web access into a vulnerability where the web servers can be proxy-chained into a pathway that cuts into the internal network. Thus, in an effort to improve the security of the borders of an internal network, a method and system to detect breaks in the border of an internal network may be required.

One system and method for network vulnerability detection and reporting is disclosed in U.S. Pat. No. 7,257,630 (the '630 patent) to Cole et al. issued on Aug. 14, 2007. The '630 patent discloses determining a topology of a network and discovering a set of responsive computers, that is, externally accessible computers, on the network. The '630 patent discloses detecting services on each of the set of responsive computers by transmitting packets to ports of each of the set of responsive computers. In addition, the '630 patent discloses generating a list of responsive ports using the transmissions received in reaction to the transmission of the packets and determining an operating system used by each of the set of responsive computers. Further, the '630 patent discloses testing for vulnerabilities by using an automated vulnerability script on each responsive port in the list of responsive ports. Each of the automated vulnerability scripts tests a vulnerability known to be associated with a computer configuration corresponding to a particular responsive port and a particular operating system.

Although the system and method of the '630 patent may assess the vulnerability of a target computer via a network, it may have several shortcomings. Shortcomings include not testing for unidirectional vulnerabilities, only looking for known vulnerabilities on known computer types, and running the detection software on a production machine. For example, the system and method of the '630 patent detect vulnerabilities that provide access to a machine, and may not be able to detect unauthorized or improper communications originating from that machine, that is, unidirectional vulnerabilities. Also, the system and method of the '630 patent tests for vulnerability known to be associated with a computer configuration comprising a particular responsive port and a particular operating system. The system and method of the '630 patent do not provide a means to detect unknown vulnerabilities. Nor does the system and method of the '630 patent provide a capability to test unknown computer configurations. Additionally, the '630 patent allows the system and method of the '630 patent to be run on a production machine. A production machine is a computer that is part of the internal network and is running processes for the internal network. Using a production machine to execute the software of the system and method of the '630 patent may take computer resources away from the execution of production tasks assigned to that computer.

SUMMARY

One aspect of the present disclosure includes a method for detecting breaks in a border of a network. The method may include monitoring network shaping and regulation traffic passing through the border. The method may also include providing, by a first confederate server on a first side of the border, a first connection request to a second confederate server on a second side of the border. Further, the method may include providing, by the second confederate server on the second side of the border, a second connection request to the first confederate server on the first side of the border. The method may also include executing a network diagnostic command if one or more of the first or second connection requests are granted. Further, the method may also include copying any outputs of the network diagnostic command to a file.

Another aspect of the present disclosure includes a computer-readable medium including instructions for performing a method, when executed by a processor, for detecting breaks in a border of a network. The instructions for performing the method may include monitoring network shaping and regulation traffic passing through the border. The instructions for performing the method may also include providing, by a first confederate server on a first side of the border, a first connection request to a second confederate server on a second side of the border. The instructions for performing the method may further include providing, by the second confederate server on the second side of the border, a second connection request to the first confederate server on the first side of the border. The instructions for performing the method may also include executing a network diagnostic command if one or more of the first or second connection requests are granted. The instructions for performing the method may further include copying any outputs of the network diagnostic command to a file.

Another aspect of the present disclosure includes a system for detecting breaks in a border of a network. The system may include at least one confederate server on each side of the border, each confederate server containing at least one memory storing data and instructions, and each confederate server containing at least one processor configured to access the memory and execute the instructions. The processor may monitor network shaping and regulation traffic passing through the border. The processor may also provide a connect request to the confederate server on the other side of the border and execute a network diagnostic command if the connect request is successful. Further, the processor may copy any outputs of the network diagnostic command to a file.

DETAILED DESCRIPTION

Figure 1:
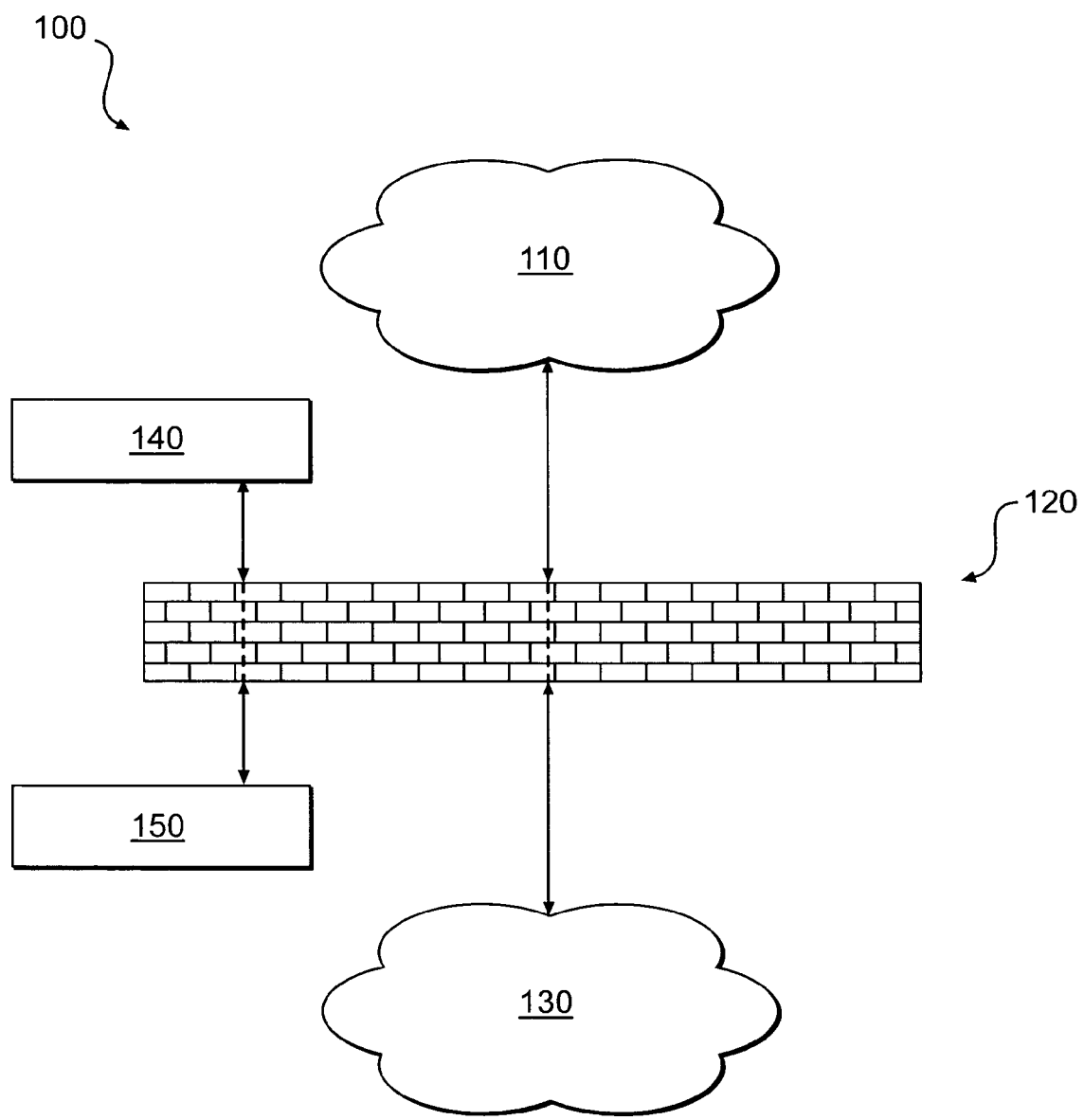
FIG. 1 illustrates an exemplary system architecture, consistent with certain disclosed embodiments.

FIG. 1 illustrates an exemplary system architecture 100 in which systems and methods consistent with the disclosed embodiments may be implemented. As shown in FIG. 1, system architecture 100 may include an internal network 110, a border 120, an external network 130, and two or more confederate servers 140 and 150. System architecture 100 may contain additional, fewer, and/or different components than those listed above or illustrated in FIG. 1. For example, system architecture 100 may include routers, switches, hubs, data storage devices, and any other device or components that may be connected or otherwise associated with a network.

Internal network 110 may embody any private or protected network that may be connected or configured to interface with external network 130 through border 120. Internal network 110 may include, for example, business intranets, private home networks, government or classified networks, and/or proprietary networks. Internal network 110 may be a single computer or may be a plurality of computers and other components. Furthermore, internal network 110 may be arranged as a single network or as a plurality of sub-networks. Internal network 110 may be a distributed architecture and, therefore, may include components and subsystems that are located in multiple different locations.

Border 120 controls traffic that is permitted to enter and leave internal network 110. Border 120 defines a change in the level of trust between two networks, such as internal network 110 and external network 130. Border 120 may be connected to internal network 110, external network 130, first confederate server 140, and second confederate server 150. Border 120 may comprise the interface between internal network 110 and external networks 130 (e.g., the Internet). Border 120 may include one or more hardware devices, such as routers, switches, proxy servers, etc. Border 120 may also include one or more software devices or components, such as security and/or monitoring software, intrusion detection systems, malicious code checkers, etc. The security and/or monitoring software and devices may be disposed on one or more servers of border 120 and/or communication lines through border 120. Although border 120 is illustrated in the exemplary embodiment shown in FIG. 1 as being a single entity or interface, it is contemplated that border 120 may embody a plurality of smaller interface points, such interface points corresponding to different hardware components accessible to/by external network 130.

The security and/or monitoring software and devices associated with border 120 may monitor communications between internal network 110 and external network 130. The security and/or monitoring software and devices of border 120 may implement at least a portion of the security policy of internal network 110. The security and/or monitoring software and devices may include key logging software, spyware, antivirus software, firewall software, data loss prevention software, and other software that may be used to identify improper communication or attempted communication within an internal network 110 and between internal network 110 and external network 130.

External network 130 may be any network that is located outside border 120. External network 130 may be connected or configured to interface with internal network 110 through border 120. External network 130 may be the Internet, or any other network that is externally located from internal network 110. External network 130 may embody any network where unrestricted access to internal network 110 may be prohibited by the security policy of internal network 110 and/or border 120. External network 130 may include one or more machines that are only configured to connect to internal network 110 through border 120.

First confederate server 140 may be one or more computers in internal network 110. First confederate server 140 may run software designed to test the permeability of border 120. First confederate server 140 may be used only for network security purposes. First confederate server 140 may be connected to one or more security management computers (not shown). Security management computers may be part of border 120. Additionally, first confederate server 140 may provide a framework on which to run software to perform tests and tools for detecting vulnerabilities associated with web servers or other high level network components. First confederate server 140 may also run software that detects rogue WAPs that give access to an internal network 110 or "free" access to a company's internet connection. Additionally, first confederate server 140 may detect devices that have an interface on two corresponding trust regions, such as between different internal networks 110. The device may be "dual homed". The two internal networks 110 may be at the same or different levels of trust. The device may forward traffic into another internal network 110, without passing the traffic through the authorized gateway, that is, border 120.

In some embodiments, because first confederate server 140 is used as security testing devices that may, at times, become vulnerable or exposed to external network 130, first confederate server 140 may be isolated or otherwise quarantined from other systems on internal network 110. For example, first confederate server 140 may be adapted to contain no confidential information and not to run production processes of internal network 110. First confederate server 140 may act as a destination and an initiator of communications to verify the exact nature and path of a break in border 120. Although first confederate server 140 is illustrated in the exemplary embodiment shown in FIG. 1 as being a single server, it is contemplated that first confederate server 140 may embody a plurality of servers, such servers corresponding to different aspects of border 120 accessible to/by external network 130.

Second confederate server 150 may be one or more computers outside border 120 in external network 130. Second confederate server 150 may be similar or identical to first confederate server 140 except to its location relative to border 120. Second confederate server 150 can run "hacker" tools that are capable of detecting proxy servers and determine if their settings are secure. Second confederate server 150 may also run software that detects rogue WAPs that give access to an internal network 110 or "free" access to a company's internet connection. Second confederate server 150 may not accept any communications originating in or from external network 130. Although second confederate server 150 is illustrated in the exemplary embodiment shown in FIG. 1 as being a single server, it is contemplated that second confederate server 150 may embody a plurality of servers, similar to first confederate server 140.

Figure 2:
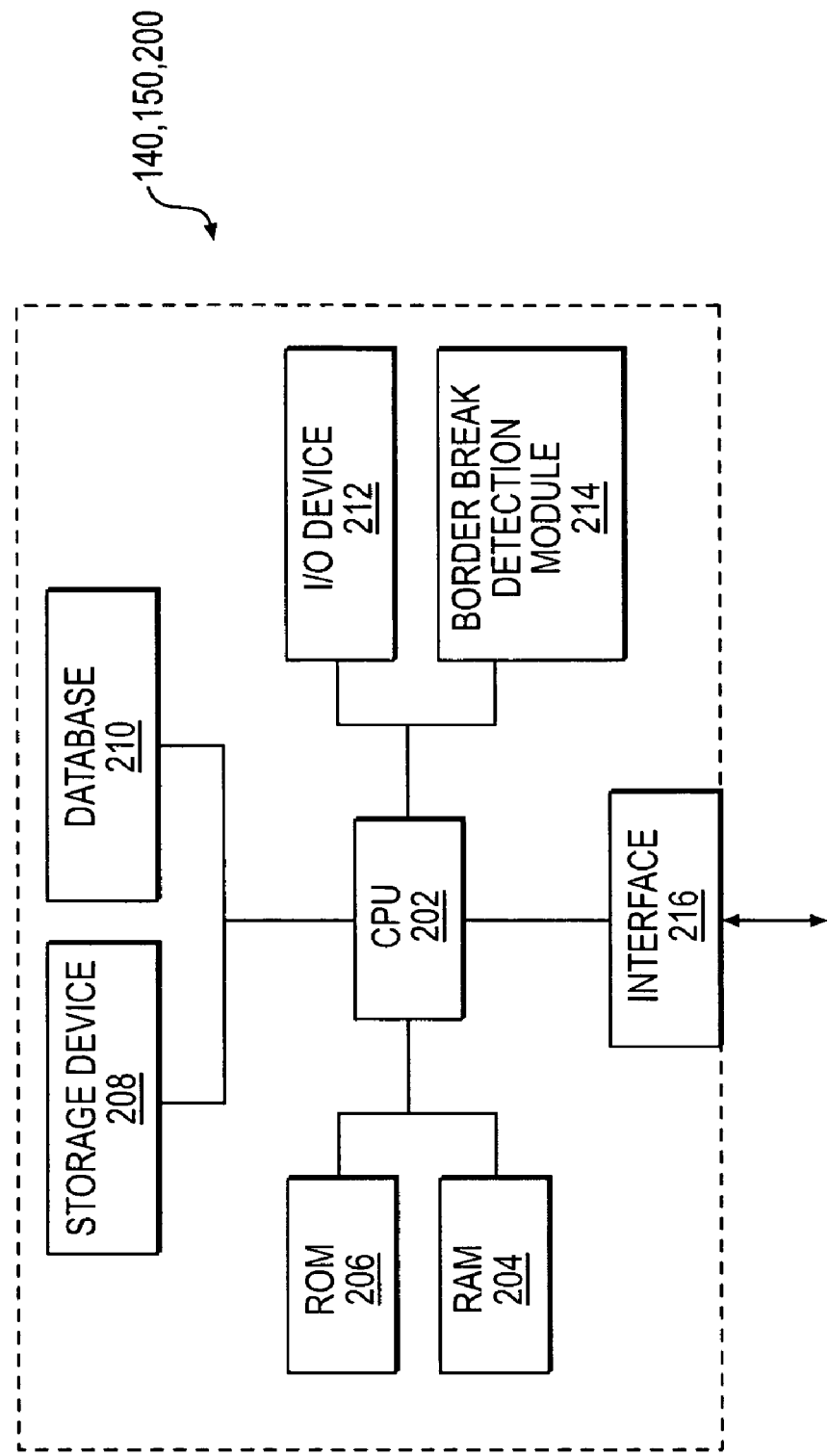
FIG. 2 diagrammatically illustrates a confederate server, which may implement an exemplary process for detecting breaks in a border of an internal network, consistent with certain disclosed embodiments.

FIG. 2 illustrates an exemplary computer 200, such as first or second confederate server 140 or 150, which may implement an exemplary process for detecting breaks in a border 120 of an internal network 110, consistent with the disclosed embodiments. Computer 200 may be a server, router, switch, client, mainframe, desktop, laptop, network computer, workstation, or any other machine or host in internal network 110 and/or external network 130. As shown in FIG. 2, computer 200 may include one or more of a central processing unit (CPU) 202, a random access memory (RAM) 204, a read-only memory (ROM) 206, a storage device 208, a database 210, one or more input/output (I/O) devices 212, border break detection module 214, and interface 216. In one exemplary embodiment, computer 200 may be a computer configured as confederate servers 140 or 150.

CPU 202 may include one or more processors, each configured to execute instructions and process data to perform functions associated with computer 200. As illustrated in FIG. 2, CPU 202 may be communicatively coupled to RAM 204, ROM 206, storage device 208, database 210, I/O device 212, border break detection module 214, and interface 216. CPU 202 may be configured to execute computer program instructions to perform various processes and methods consistent with certain disclosed embodiments. In one exemplary embodiment, computer program instructions may be loaded into RAM 204 for execution by CPU 202.

RAM 204 and ROM 206 may each include one or more devices for storing information associated with an operation of computer 200 and/or CPU 202. For example, RAM 204 may include a memory device for storing data associated with one or more operations of CPU 202. ROM 206 may include a memory device configured to access and store information associated with computer 200, including information for identifying, initializing, and monitoring the operation of one or more components and subsystems of computer 200. For example, instructions stored on ROM 206 may be loaded into RAM 204 for execution by CPU 202.

Storage device 208 may include any type of storage device configured to store any type of information used by CPU 202 to perform one or more processes consistent with the disclosed embodiments. Storage device 208 may include one or more magnetic and/or optical disk devices, such as, for example, hard drives, CD-ROMs, DVD-ROMs, a universal serial bus (USB) port, a floppy, or any other type of mass media device.

Database 210 may include one or more software and/or hardware components that store, organize, sort, filter, and/or arrange data used by computer 200 and/or CPU 202. Database 210 may store one or more tables, lists, or other data structures containing data associated with border 120, IP addresses, host information, confederate servers 140 and/or 150, and any other data useful in detecting breaks in border 120 of an internal network 110.

I/O device 212 may include one or more components configured to communicate information associated with computer 200. For example, I/O device 212 may include a console with an integrated keyboard and mouse to allow a user to input parameters associated with computer 200 and/or data useful in detecting breaks in border 120 of an internal network 110. I/O device 212 may include one or more displays or other peripheral devices, such as, for example, printers, speaker systems, electronic tablets, scanners, or any other suitable type of I/O device 212.

Border break detection module 214 may include one or more software programs, instructions, and/or listings configured to perform processes consistent with certain disclosed embodiments. For example, border break detection module 214 may include a computer program stored on computer 200, such as first and second confederate server 140 and 150. Border break detection module 214 may be configured, when executed by CPU 202, to perform one or more processes for receiving and processing information associated with detecting breaks in border 120 of an internal network 110. Border break detection module 214 may be configured, when executed by CPU 202, to generate an alert if one or more breaks in border 120 of an internal network 110 are detected.

Border break detect module 214 may contain software to perform one or more processes for attempting to establish a connection between first confederate server 140 and second confederate server 150 on different sides of border 120. Border break detect module 214 may also contain software to perform one or more processes for attempting to force traffic from/to a first confederate server 140 through border 120 to/from a second confederate server 150. When attempting to establish a connection between first and second confederate servers 140 and 150 on different sides of border 120, border break detection module 214 may negotiate a path through border 120. When attempting to establish a connection between first confederate servers 140 and second confederate server 150, border break detect module 214 may detect paths that have been created through border 120 that violate security policy and/or network design principles. When attempting to force traffic from/to a first confederate server 140 through border 120 to/from a second confederate server 150, border break detection module 214 may detect vulnerabilities that could be exploited, or are being exploited, in border 120. When attempting to force traffic through border 120, border break detection module 214 may use normal networking abilities to present a packet, destined to another confederate server 140 or 150, to each host in the subnet. Those hosts offering any sort of routing or forwarding services will pass the packet to another confederate server 140 or 150, if they are able, thus confirming that the host is providing a containment break.

Border break detection module 214 may further monitor network shaping and regulation traffic passing through border 120. Additionally, border break detection module 214 may detect new hosts in the address space of border 120. The address space of border 120 may include all the possible addresses that a connection could be established with, and includes the address of every device in border 120, and any addresses of a device detectable through border 120.

Further, border break detection module 214 may have a series of network diagnostic commands. Network diagnostic commands may determine the initiating host, the destination host, the path through border 120, port numbers, and/or the hosts that are providing the path. Additional and/or alternate data may be collected by network diagnostic commands. Network diagnostic commands may be initiated after a successful connection, a detected connection request, a successful attempt to force traffic through border 120, or a detected attempt to force traffic to confederate server 140 or 150.

Interface 216 may include one or more components configured to transmit and receive data, such as, for example, one or more modulators, demodulators, multiplexers, de-multiplexers, network communication devices, wireless devices, antennas, modems, and any other type of device configured to enable data communication via any suitable communication network. While interface 216 may be depicted as a physical bus, interface 216 may also include using and/or connecting to internal network 110 or external network 130. Interface 216 may also be configured to provide remote connectivity between CPU 202, RAM 204, ROM 206, storage device 208, database 210, one or more I/O devices 212, and/or border break detection module 214 to collect, analyze, and distribute data or information associated with detecting breaks in border 120 of an internal network 110.

Computer 200 may include additional, fewer, and/or different components than those listed above and it is understood that the listed components are exemplary only and not intended to be limiting. For example, one or more of the hardware components listed above may be implemented using software. In one exemplary embodiment, storage device 208 may include a software partition associated with one or more other hardware components of computer 200. Additional hardware or software may also be used to operate computer 200, such as, for example, security applications, authentication systems, dedicated communication systems, etc. The hardware and/or software may be interconnected and accessed as required by authorized users.

Figure 3:
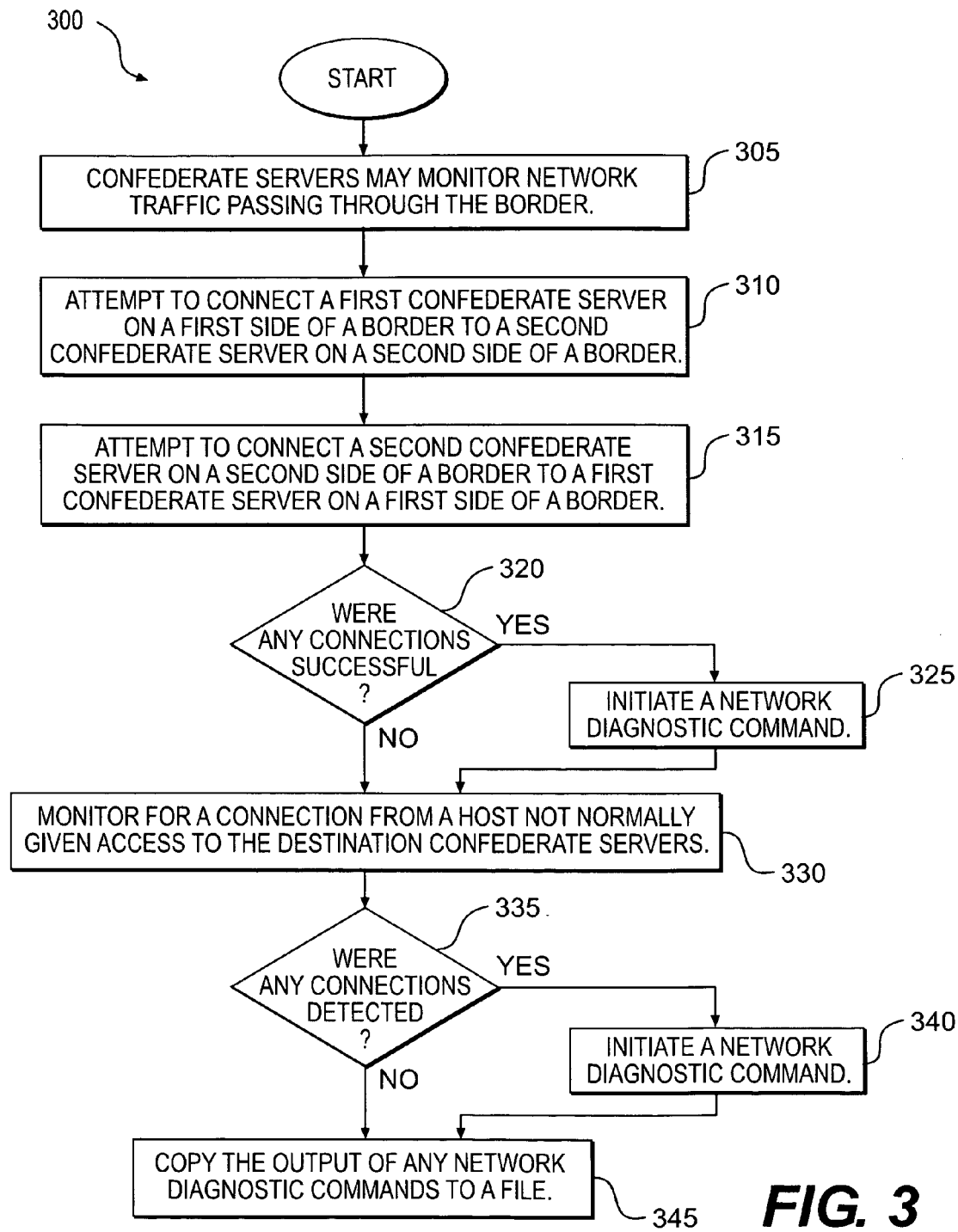
FIG. 3 illustrates a flowchart of an exemplary process for establishing connections between confederate servers to detect breaks in a border of a network, consistent with certain disclosed embodiments.

FIG. 3 illustrates a flowchart 300 of an exemplary process for establishing connections between first confederate server 140 and second confederate server 150 to detect breaks in a border 120 of an internal network 110, consistent with certain disclosed embodiments. The process of FIG. 3 may be performed by first and second confederate servers 140 and 150. For example, first and second confederate servers 140 and 150 may execute one or more software programs, such as border break detection module 214, that may perform one or more of the process steps of FIG. 3.

Referring to FIG. 3, confederate servers 140 and 150 may monitor network regulation and shaping traffic passing through border 120 (step 305). Confederate servers 140 and/or 150 may sample network regulation and shaping traffic entering and/or leaving border 120. Confederate servers 140 and/or 150 may monitor DHCP announcements that explain the network address range. Confederate servers 140 and/or 150 may monitor routing protocol announcements that explain which devices are gateways in border 120. Confederate servers 140 and/or 150 may monitor ICMP redirects that attempt to funnel traffic through "hacker sniffing" devices. Confederate servers 140 and/or 150 may monitor traffic patterns and bandwidth usage. Confederate servers 140 and/or 150 may analyze the network regulation and shaping traffic from host computers on border 120 that are not authorized to send traffic to hosts indirectly connected to border 120. Confederate servers 140 and/or 150 may create an alert if unexpected network regulation and shaping traffic and/or traffic patterns are observed.

Border break detection module 214 of first confederate server 140 may attempt to connect first confederate server 140 on a first side of border 120 to a second confederate server 150 on a second side of border 120 (step 310). For example, first confederate server 140 may be located inside internal network 110 and on the interior of border 120. First confederate server 140 may attempt to connect to second confederate server 150 outside of border 120. The connection may normally be prevented by security policy and network design. Attempting to establish a connection between first confederate servers 140 and second confederate server 150 on different sides of border 120 may involve attempting to negotiate a path through border 120.

Border break detection module 214 of second confederate server 150 may attempt to connect second confederate server 150 on a second side of border 120 to a first confederate server 140 on a first side of border 120 (step 315). For example, second confederate server 150 may be outside border 120 and outside internal network 110. Second confederate server 150 may attempt to connect to first confederate server 140 inside of border 120. The connection may normally be prevented by security policy and/or network design. Attempting to establish a connection between first confederate servers 140 and second confederate server 150 on different sides of border 120 may involve attempting to negotiate a path through border 120.

After first and second confederate servers 140 and 150 attempt to connect to each other, border break detection modules 214 may determine if any connections were successful (step 320). A successful connection may be identified as including a first confederate server 140 connecting to second confederate server 150, where the connection is normally prevented by security policy and/or network design. Additionally, a successful connection may be identified as including second confederate server 150 connecting to first confederate server 140, where the connection is normally prevented by security policy and/or network design. If there was one or more successful connections, border break detection module 214 will next execute step 325. If there were no successful connections, border break detection module 214 will next execute step 330.

If there was a successful connection, a network diagnostic command may be initiated (step 325). The network diagnostic command may determine the initiating host, the destination host, the path through border 120, port numbers, and/or the hosts that are providing the path. Additional and/or alternate data may be collected. After the network diagnostic commands have been run, step 330 may next be executed.

After trying to connect to other confederate servers 140 and 150, border break detection module 214 may monitor for a connection from a host that is not normally given access to a destination confederate servers 140 or 150 (step 330). A destination first confederate server 140 or a destination second confederate server 150 may be the receiving server of an attempted or successful connection. A destination first confederate server 140 may detect a connection from a second confederate server 150 being established that violates a security policy or the network design. A destination second confederate server 150 may also detect a connection from a first confederate server 140 that violates a security policy or the network design. If a destination first confederate server 140 or a destination second confederate server 150 detects an attempted connection, the attempted connection succeeded in finding a path through border 120, even if the connection is rejected by destination first confederate server 140 or destination second confederate server 150.

After monitoring for a connection between a host not normally given access to first and second confederate servers 140 and 150, border break detection modules 214 will determine if any connections were detected (step 335). If there was one or more detected connections, border break detection module 214 will next execute step 340. If there were no detected connections, border break detection module 214 will next execute step 345.

If a connection was detected that violates security policy and/or the network design, a network diagnostic command may be initiated (step 340). The network diagnostic command may determine the initiating host, the destination host, the path through border 120, port numbers, and/or the hosts that are providing the path. Additional and/or alternate data may be collected. After the network diagnostic commands have been run, step 345 may next be executed.

After monitoring for a connection between a host not normally given access to first and second confederate servers 140 or 150, border break detection modules 214 may copy the output of any network diagnostic commands to a file (step 345). A network diagnostic command may be executed when either a first confederate server 140 successfully connects to a second confederate server 150 or a second confederate server 150 successfully connects to a first confederate server 140. A network diagnostic command may also be executed when first confederate server 140 detects a connection from a second confederate server 150 or another host not normally given access. A network diagnostic command may further be executed when second confederate server 150 detects a connection from a first confederate server 140 or another host not normally given access. The network diagnostic command may determine the initiating host, the destination host, the path through border 120, port numbers, and/or the hosts that are providing the path. The data determined by the network diagnostic command may be saved to one or more of a file, a log, a report, and/or may generate an alert. An alert may include one or more of an alarm, e-mail, or electronic message to a pager of one or more persons or entities.

While certain aspects and features associated with the process described above may be described as being performed by one or more particular components, such as, first confederate server 140 and/or second confederate server 150, it is contemplated that these features may be performed by any suitable computing system. Furthermore, it is also contemplated that the order of steps in FIG. 3 is exemplary only and that certain steps may be performed before, after, or substantially simultaneously with other steps illustrated in FIG. 3. For example, in some embodiments, steps 310 to 325 may be performed before, simultaneously, or after steps 330 to 340.

Figure 4:
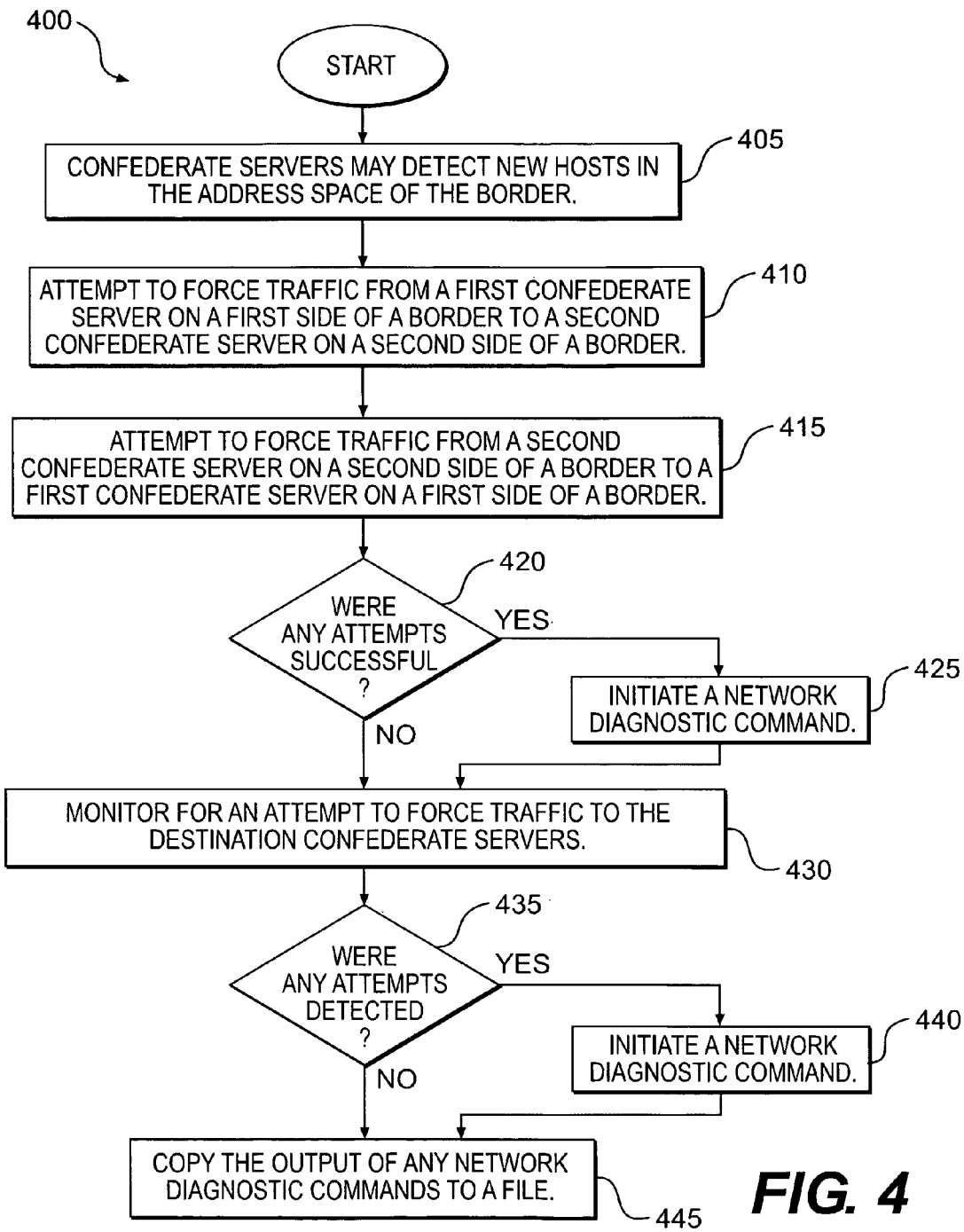
FIG. 4 illustrates a flowchart of an exemplary process for attempting to force traffic through each device in a border of a network to a confederate server to detect breaks in a border of a network, consistent with certain disclosed embodiments.

FIG. 4 illustrates a flowchart 400 of an exemplary process for attempting to force traffic through each device in a border 120 of a network to a first confederate server 140 and a second confederate server 150 to detect breaks in a border 120 of an internal network 110, consistent with certain disclosed embodiments. The process of FIG. 4 may be performed by first and second confederate servers 140 and 150. For example, first and second confederate servers 140 and 150 may execute one or more software programs, such as border break detection module 214, that may perform one or more of the process steps of FIG. 4.

Referring to FIG. 4, confederate servers 140 and/or 150 may detect new hosts in the address space of border 120 (step 405). Confederate servers 140 and/or 150 may detect all the devices and addresses for a border 120. Confederate servers 140 and/or 150 may detect any new devices or addresses that are added to border 120. In one exemplary embodiment, a table or listing of addresses may be developed heuristically. In an alternate embodiment, a table or listing of addresses may be entered and/or confirmed manually. Confederate servers 140 and/or 150 may create an alert if an unexpected device or address is detected in border 120.

After detecting new hosts in the address space of the border, border break detection module 214 of first confederate server 140 may attempt to force traffic from a first confederate server 140 on a first side of border 120 to a second confederate server 150 on a second side of border 120 (step 410). For example, first confederate server 140 may be located inside internal network 110 and on the interior of border 120. First confederate server 140 may try to force traffic through every device and address associated with border 120. Forcing traffic may include attempting to force a communication from a source to a destination through border 120 without permission of border 120. First confederate server 140 may systematically use normal networking abilities to present a packet, destined to second confederate server 150, to each host in the subnet. Those hosts offering any sort of routing or forwarding services will pass the packet to second confederate server 150, if they are able, thus confirming that the host is providing a containment break. To reduce interference with production traffic and normal operation of border 120, first confederate server 140 may attempt to force traffic through during off-peak times, during scheduled times, and/or may spread the attempts over several addresses, rather than serially attacking one device or address before trying the next.

Border break detection module 214 of second confederate server 150 may attempt to force traffic from a second confederate server 150 on a second side of border 120 to a first confederate server 140 on a first side of border 120 (step 415). For example, second confederate server 150 may be located outside border 120 of internal network 110. Second confederate server 150 may try to force traffic through every device and address associated with border 120. Second confederate server 150 may systematically use normal networking abilities to present a packet, destined to first confederate server 140, to each host in the subnet. Those hosts offering any sort of routing or forwarding services will pass the packet to first confederate server 140, if they are able, thus confirming that the host is providing a containment break. To reduce interference with production traffic and normal operation of border 120, second confederate server 150 may attempt to force traffic through during off-peak times, during scheduled times, and/or may spread the attempts over several addresses, rather than serially attacking one device or address before trying the next.

After first and second confederate servers 140 and 150 attempt to force traffic to each other, border break detection modules 214 will determine if any attempts were successful (step 420). A successful attempt may be identified as including a first confederate server 140 forcing traffic to a second confederate server 150. Additionally, a successful attempt may be identified as including a second confederate server 150 forcing traffic to a first confederate server 140. If there was one or more successful attempts, border break detection module 214 will next execute step 425. If there were no successful attempts, border break detection module 214 will next execute step 430.

If there was a successful attempt, a network diagnostic command may be initiated (step 425). The network diagnostic command may determine the initiating host, the destination host, the path through border 120, port numbers, and/or the hosts that are providing the path. Additional and/or alternate data may be collected. After the network diagnostic commands have been run, step 430 may next be executed.

After trying to connect to other confederate servers 140 and 150, border break detection modules 214 may monitor for an attempt to force traffic to a destination confederate servers 140 and 150 (step 430). A destination first confederate server 140 or a destination second confederate server 150 may detect an attempt to force traffic to it. A destination first confederate server 140 may be the receiving server of an attempted forcing or communication. A destination second confederate server 150 may also be the receiving server of an attempted forcing or communication. If a destination first confederate server 140 or a destination second confederate server 150 detects an attempt to force traffic to it, the attempt succeeded in pushing the forced traffic through border 120, even if the traffic is rejected by destination first confederate server 140 or destination second confederate server 150.

After monitoring for an attempt to force traffic to destination confederate servers 140 and 150, border break detection modules 214 will determine if attempts to force traffic were detected by destination first confederate server 140 or destination second confederate server 150 (step 435). An attempt to force traffic may be detected if a destination first confederate server 140 or a destination second confederate server 150 detects traffic that is unexpected or improper. If there was one or more detected attempts to force traffic, border break detection module 214 will next execute step 440. If there were no detected attempts to force traffic to destination first confederate server 140 or to destination second confederate server 150, border break detection module 214 will next execute step 445.

If an attempt to force traffic to a confederate server 140 or 150 was detected by the destination confederate server 140 or 150, a network diagnostic command may be initiated (step 440). The network diagnostic command may determine the initiating host, the destination host, the path through border 120, port numbers, and/or the hosts that are providing the path. Additional and/or alternate data may be collected. After the network diagnostic commands have been run, step 445 may next be executed.

After monitoring for an attempt to force traffic to destination confederate servers 140 or 150, border break detection module 214 may copy the output of any network diagnostic commands to a file (step 445). The data determined by the network diagnostic command may be saved to one or more of a file, a log, a report, and/or may generate an alert. An alert may include one or more of an alarm, e-mail, or electronic message to a pager of one or more persons or entities.

While certain aspects and features associated with the process described above may be described as being performed by one or more particular components, such as, first confederate server 140 and/or second confederate server 150, it is contemplated that these features may be performed by any suitable computing system. Furthermore, it is also contemplated that the order of steps in FIG. 4 is exemplary only and that certain steps may be performed before, after, or substantially simultaneously with other steps illustrated in FIG. 4. For example, in some embodiments, steps 410 to 425 may be performed before, simultaneously, or after steps 430 to 440.

Industrial Applicability

The disclosed embodiments may be implemented with processes involving security of a border 120 of internal network 110. The disclosed embodiments may achieve improved performance for detecting breaks in a border 120 of an internal network 110. In particular, the disclosed embodiments may provide for detection of unknown vulnerabilities, detection of unidirectional vulnerabilities, and improved performance of production machines.

The disclosed embodiments may be useful in the testing for breaks in border 120 of an internal network 110. Internal network 110 may include business intranets, home networks, government or proprietary networks, or classified networks. Border 120 may be composed of many devices and software, and with the growing complexity of the machines and software that compose border 120, vulnerabilities are becoming more frequent, while their detection becomes more and more difficult. The disclosed embodiment allows for the testing and detection of potential breaks in border 120 before those breaks are exploited by an entity.

For example, the disclosed embodiments may test for possible breaches of border 120 by using normal networking abilities to present a packet, destined to another confederate server 140 or 150, to each host in the subnet. Those hosts offering any sort of routing or forwarding services will pass the packet to the other confederate server 140 or 150, if they are able, thus confirming that the host is providing a containment break. Current or potentially exploitable vulnerabilities may be detected. Some vulnerabilities that may be detected include dual-homed device with IP forwarding enabled across two borders 120. Another vulnerability may be a dual-homed virtual server that has simultaneous connections to two different internal networks 110. A further example may include a router implementing Proxy Arp, a service that will forward traffic despite hard-coded routing rules and host configurations preventing this.

Additionally, the system and method of the disclosed embodiment may detect unidirectional breaches. A unidirectional breach may be a one-way hole in border 120, that is, data may flow in only one direction. First confederate server 140 is on the interior of border 120 trying to create a break in border 120 to reach second confederate server 150 outside border 120. Second confederate server 150 is outside border 120 trying to create a break in border 120 to reach first confederate server 140 on the interior of border 120. Because border 120 is being tested in both directions of traffic flow, both bidirectional and unidirectional paths or vulnerabilities may be detected in border 120.

Further, the disclosed embodiments may not decrease production server operations. For example, because the disclosed system and method runs on dedicated confederate servers 140 and 150, machines on the network that are expected to perform other network functions or services remain undisturbed during vulnerability tests. Accordingly, the execution of tasks assigned to a production computer is not reduced by also running system vulnerability testing. Furthermore, because confederate servers 140 and 150 may be isolated from other components on the network, successful "test" breach may be isolated to first confederate server 140, and may not interfere with normal network operations.

Additionally, confederate servers 140 and 150 are isolated from internal network 110, and use minimimal software to operate. If an entity compromises confederate servers 140 and/or 150, the security impact and risk that a confederate servers 140 and/or 150 can be used to compromise the overall security of internal network 110 is reduced. Confederate servers 140 and/or 150 may be difficult to use in an attack, such as a denial-of-service attack against the production servers of internal network 110.

What is claimed is:

1. A method for detecting breaks in a border of a network, comprising:
   monitoring network shaping and regulation traffic passing through the border;
   bi-directionally testing the security of the border, including:
      providing, by a first confederate server on a first side of the border, a first connection request to a second confederate server on a second side of the border, wherein the first connection request is normall denied by a security policy;
      providing, by the second confederate server on the second side of the border, a second connection request to the first confederate server on the first side of the border, wherein the second connection request is normally denied by a security policy;
      executing a network diagnostic command if one or more of the first second connection requests are granted; and
      copying any outputs of the network diagnostic command to a file.

2. The method as in claim 1, further including:
   monitoring for a connection request from a host not normally given access to a destination confederate server; and
   executing the network diagnostic command if the connection request from the host not normally given access is detected.

3. The method as in claim 1, further including:
   detecting new hosts in an address space of the border;
   attempting to force traffic through the border, from the first confederate server on the first side of the border to the second confederate server on the second side of the border;
   attempting to force traffic through the border, from the second confederate server on the second side of the border to the first confederate server on the first side of the border;
   executing the network diagnostic command if traffic was successfully forced through the border to another confederate server; and
   copying any output of the network diagnostic command to the file.

4. The method as in claim 3, further including:
   monitoring for an attempt to force traffic to a destination confederate server; and
   executing the network diagnostic command if the attempt is detected.

5. The method as in claim 3, wherein the output of the network diagnostic command includes one or more of an initiating host, a destination host, a path through the border, port numbers, and any hosts that are providing the path through the border.

6. The method as in claim 3, further including providing a framework on the confederate server to run software to perform tests and tools for detecting vulnerabilities associated with web servers or other network components.

7. The method as in claim 3, further including generating an alert based on any outputs of the network diagnostic command.

8. A non-transitory computer-readable medium storing instructions that, when executed by a processor, cause the processor to perform a method for detecting breaks in a border of a network, the method comprising:
   monitoring network shaping and regulation traffic passing through the border;
   bi-directionally testing the security of the border, including:
      providing, by a first confederate server on a first side of the border, a first connection request to a second confederate server on a second side of the border, wherein the first connection request is normally denied by a security policy;
      providing, by the second confederate server on the second side of the border, a second connection request to the first confederate server on the first side of the border, wherein the second connection request is normally denied by a security policy;
      executing a network diagnostic command if one or more of the first or second connection requests are granted; and
      copying any outputs of the network diagnostic command to a file.

9. A non-transitory computer-readable medium as in claim 8, the method further including:
   monitoring for a connection request from a host not normally given access to a destination confederate server; and
   executing the network diagnostic command if the connection request from the host not normally given access is detected.

10. A non-transitory computer-readable medium as in claim 8, the method further including:
    detecting new hosts in an address space of the border;
    attempting to force traffic through the border, from the first confederate server on the first side of the border to the second confederate server on the second side of the border;
    attempting to force traffic through the border, from the second confederate server on the second side of the border to the first confederate server on the first side of the border;
    executing the network diagnostic command if traffic was successfully forced through the border to another confederate server; and
    copying any output of the network diagnostic command to the file.

11. A non-transitory computer-readable medium as in claim 10, the method further including:
    monitoring for an attempt to force traffic to a destination confederate server; and
    executing the network diagnostic command if the attempt is detected.

12. A non-transitory computer-readable medium as in claim 10, wherein the output of the network diagnostic command includes one or more of an initiating host, a destination host, a path through the border, port numbers, and any hosts that are providing the path through the border.

13. The non-transitory computer-readable medium as in claim 10, further including providing a framework on the confederate server to run software to perform tests and tools for detecting vulnerabilities associated with web servers or other network components.

14. The non-transitory computer-readable medium as in claim 10, further including generating an alert based on any outputs of the network diagnostic command.

15. A system for detecting breaks in a border of a network, comprising:
- at least one confederate server on opposite sides of the border;
- each confederate server containing at least one memory storing data and instructions; and
- each confederate server containing at least one processor configured to access the memory and configured to, when executing the instructions:
  - monitor network shaping and regulation traffic passing through the border;
  - bi-directionally test the security of the border, including to:
    - provide a first connect request to the confederate server on the opposite side of the border that is normally denied by a security policy;
    - receive a second connection request from the confederate server on the opposite side of the border that is normally denied by a security policy;
    - execute a network diagnostic command if the connect request is successful; and
    - copy any outputs of the network diagnostic command to a file.

16. The system as in claim 15, wherein the at least one processor, when executing the instructions, is further configured to:
- monitor for a connection request from a host not normally given access to the confederate server; and
- execute the network diagnostic command if the connection request from the host not normally given access is detected.

17. The system as in claim 15, wherein the at least one processor, when executing the instructions, is further configured to:
- detect new hosts in an address space of the border;
- attempt to force traffic through the border to the confederate server on the other side of the border;
- execute the network diagnostic command if traffic was successfully forced through the border to another confederate server; and
- copy any outputs of the network diagnostic command to the file.

18. The system as in claim 17, wherein the at least one processor, when executing the instructions, is further configured to:
- monitor for an attempt to force traffic to the confederate server; and
- execute the network diagnostic command if the attempt is detected.

19. The system as in claim 17, wherein the output of the network diagnostic command includes one or more of an initiating host, a destination host, a path through the border, port numbers, and any hosts that are providing the path through the border.

20. The system as in claim 17, wherein the at least one processor, when executing the instructions, is further configured to generate an alert based on any outputs of the network diagnostic command.

* * * * *